UNITED STATES PATENT OFFICE.

RANDAL E. TALLEY, OF IRWIN, PENNSYLVANIA, ASSIGNOR TO WESTINGHOUSE ELECTRIC AND MANUFACTURING COMPANY, A CORPORATION OF PENNSYLVANIA.

GEAR.

1,223,216.  Specification of Letters Patent.  Patented Apr. 17, 1917.

No Drawing.    Application filed December 9, 1916.   Serial No. 136,025.

*To all whom it may concern:*

Be it known that I, RANDAL E. TALLEY, a citizen of the United States, and a resident of Irwin, in the county of Westmoreland and State of Pennsylvania, have invented a new and useful Improvement in Gears, of which the following is a specification.

My invention relates to composite gear wheels, pinions and other machine elements, and it has for its object to provide machine elements of this character which shall be noiseless in operation and highly resistant, under operating conditions, to the effects of heat, oil and mechanical shocks.

In the patents to Conrad, 1,167,742 and 1,167,743, is described and claimed a new class of gearing composed wholly, or in part, of a strong and durable mixture of fibrous material and a binder. The gears therein shown consist specifically of laminations of paper or cloth impregnated with a binder and united under such conditions as to form a hard, infusible and substantially insoluble integral mass. My present invention aims to produce gears and other machine elements of the same general type as those described in the above-mentioned patents, and it has particular relation to the manufacture of such machine elements by molding methods.

Resinous condensation products produced by reaction between phenolic substances and substances containing active replaceable methylene groups, such as formaldehyde and hexamethylene-tetramin, have been applied to many uses, either alone or in combination with various fillers. It has been proposed to mold gears from materials of this kind, but it has heretofore been considered, presumably on account of the relatively low tensile strength of these resins, that the resins or compositions containing them must be combined with metallic end plates or other reinforcing members in order to produce gears having the requisite mechanical strength. The fillers which have been suggested for use in admixture with phenolic resins for the manufacture of gears have been either non-fibrous in character or, if fibrous, have consisted of wood flour, asbestos and other short fibers having little or no interlocking power.

I have discovered that, if phenolic resins or other binders are intimately mixed with fibrous materials having long fibers and are molded under the proper conditions, gears and other machine elements may be produced having working body portions which are entirely self-sustaining under the conditions of service and which, therefore, require no end plates or other reinforcement. Many kinds of fibrous materials are suitable for my purpose, such as long and short staple raw cotton, hemp and other textile fibers, as well as certain varieties of long-fiber asbestos. Ordinary asbestos is not suitable for my purpose, not only because of the short and weak material of its fibers but on account of its abrasive properties which render composite gears made from asbestos unsuitable for meshing with metallic gears.

The fibrous material and the binder may be mixed together in any suitable way and in various proportions. For example, the binder may be dissolved in a solvent and the fibers may be immersed in the solution, the excess of solution being squeezed out by means of suitable rollers and the mass heated sufficiently to drive off the solvent. If phenolic condensation products, in their soluble stage, are used as binders, methyl alcohol may suitably be employed as the solvent. The binder may also be applied to the fibrous material in the form of powder sprinkled among the fibers.

Another method of uniformly mixing the binder with the fibrous material consists in first crushing the binder and then tumbling it with water in a ball mill until it is finally pulverized and suspended in the water in the form of an emulsion. The fibrous material is then introduced into this emulsion and thoroughly agitated in a ball mill or otherwise, in order to mix the fibers and the binder uniformly together. The water is then drained off, and the mass of fibrous material and binder is dried, producing evenly mixed material which is well suited to molding operations in general, as well as to the production of gears and other machine elements.

As indicated above, the proportions of the materials comprising my molded machine elements may be considerably varied. If phenolic condensation products are used as binders in connection with cotton fibers, the proportions of these materials may suitably be about 10 parts by weight of the fibers and 6 parts by weight of the binder.

The molding material prepared in the manner described above is formed into gear wheels, pinions and other machine elements by compression in a hot mold according to the methods well known in the molding art. The molds should be cut with the greatest possible accuracy, in which case, the resulting gears, in addition to being exactly alike, are more accurately shaped than gears which are cut by ordinary milling methods.

In order to economize labor and time in the manufacture of these gears, I prefer to mold them in multiple, which may be accomplished, when gear wheels are to be molded, either by providing a mold with several dies arranged side by side and adapted to be operated upon by a single stroke of a molding press, or by providing a tall mold of a cross section corresponding to the contour of a single gear and forming a series of gears therein at a single operation. In the latter instance, sufficient molding material to form one gear is placed upon the mold, a steel plate or other suitable partition is placed upon this material and another portion of molding material is placed upon the plate, the alternate arrangement of molding material and separating plates being continued to the top of the mold and pressure being applied to the entire stack by a single compression of the molding plunger. It will, of course, be understood that the proper amount of molding material for each gear is carefully weighed preparatory to the molding operation.

Gears and pinions made in the above-described manner are found to have the working faces of their teeth covered with a thin layer of binder, and are thus distinguished from composite gears which are cut from composite materials containing fibrous fillers. In the latter case, the ends of the fibers are exposed on the working surfaces of the gears and may absorb oil or water while the gears are in use.

My composite gears may be handled and used in all respects like metal gears. Since these gears are highly resistant to the effects of heat, oil and moisture, they do not deteriorate or become warped in use as do such materials as raw hide, leather, fiber and the like. These gears are also self-lubricating to a considerable degree.

While I have specifically mentioned the use of phenolic condensation products as suitable binders for use in the manufacture of my molded gears, it is to be understood that other binders may be utilized for this purpose such, for example, as shellac, copal, and other binders which will produce firm, self-sustaining and wear-resisting gears and which will not be injuriously affected by operating conditions. It is to be understood that my invention includes the use of such other binders, as well as all modifications in materials and methods which fall within the scope of the appended claims.

I claim as my invention:

1. A machine element having a molded working body portion comprising a non-abrasive fibrous material and a binder.

2. A gear having a molded working body portion comprising a non-abrasive fibrous material and a binder.

3. A gear having a self-sustaining molded working body portion comprising a non-abrasive fibrous material and a binder.

4. A molded gear composed of textile fibrous material and a binder and a film coating on its working faces.

5. A molded gear composed of cotton fibers and a binder.

6. A gear having a molded working body portion comprising a non-abrasive fibrous material and a phenolic condensation product.

7. A gear having a self-sustaining molded working body portion comprising a non-abrasive fibrous material and a binder comprising a phenolic condensation product.

8. A molded gear composed of textile fibrous material and a binder comprising a phenolic condensation product.

9. A molded gear composed of cotton fibers and a binder comprising phenolic condensation products.

10. A molded gear composed of a fibrous material and a binder, a portion of which constitutes a complete coating to resist attacks by heat, oil or water under operating conditions.

11. A molded gear composed of fibrous material and a binder that is unimpaired by operating temperatures.

In testimony whereof, I have hereunto subscribed my name this 27th day of Nov. 1916.

RANDAL E. TALLEY.